United States Patent [19]

Steele

[11] 3,900,847

[45] Aug. 19, 1975

[54] SATELLITE AIDED VEHICLE AVOIDANCE SYSTEM

[75] Inventor: Ernest R. Steele, 100 North St., Bath, Maine 04530

[73] Assignee: The United States of America as represented by the United States National Aeronautics and Space Administration Office of General Counsel-Code GP, Washington, D.C.

[22] Filed: Jan. 21, 1972

[21] Appl. No.: 219,722

[52] U.S. Cl. .................... 343/6.5 R; 343/112 CA
[51] Int. Cl. .............................................. G01s 9/56
[58] Field of Search .................. 343/6.5 R, 112 CA

[56] References Cited
UNITED STATES PATENTS

| 3,550,129 | 12/1970 | Steele | 343/112 CA |
| 3,566,404 | 2/1971 | Sorkin | 343/6.5 R |
| 3,691,559 | 9/1972 | Jackson | 343/6.5 R X |

Primary Examiner—T. H. Tubbesing
Attorney, Agent, or Firm—Monte F. Mott; Paul F. McCaul; John R. Manning

[57] ABSTRACT

An improved satellite aided vehicle avoidance system (SAVAS) is described in which exact range from a protected vehicle to an intruding vehicle with mutual-collision heading and velocity is derived without signal transmission by the protected vehicle or use of synchronized time reference devices. The improved SAVAS enables the practicing of a novel method which comprises the steps of: broadcasting a repeated signal sequence from a satellite to participating vehicles; transponding portions of the sequence in turn by the vehicles with an additional signal; receiving in the protected vehicle the direct satellite signal, the transponded satellite signal and the additional signal; measuring in the protected vehicle the propagation delay between the received direct and transponded satellite signals, the Doppler frequency difference between the received direct and transponded satellite signals, and the Doppler shift of the received additional signal; and determining the range between the protected vehicle and the intruding vehicle which transponded the satellite signal and added the additional signal by multiplying the propagation delay by the velocity of light and further by the ratio of the obtained Doppler shift of the additional signal to the obtained Doppler difference between the direct and transponded satellite signals. Additional steps of measuring time-to-collision from the delay and Doppler measurements, establishing ordered time-slots from the form of the satellite signal may be included.

20 Claims, 2 Drawing Figures

SATELLITE AIDED VEHICLE AVOIDANCE SYSTEM

ORIGIN OF INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

In recent years, the use of aircraft as a transportation medium has become extremely widespread, resulting in a tremendous growth of commercial, private and military aircraft. As the number of aircraft has increased, the probability of mid-air collisions has also increased. Because the aircraft can receive a collision from numerous angles that are out of the view of the pilot even the most observant pilot is subject to the possibility of a mid-air collision. Even when another aircraft is located in what is normally an observable region, it may be obscured by clouds, for example. Hence, it is desirable to provide a method of aiding pilots by warning them of the approach of intruding aircraft. Receipt of significant information about the intruder and a logical determination of a suitable avoidance maneuver is also desirable.

2. Description of the Prior Art

The prior art has, to some extent, attempted to solve the problem of mid-air aircraft collisions. It has proposed various methods of detecting and assessing the probability of a mid-air collision so that the pilots of the aircraft can be warned in time to take evasive action. For example, complex radar systems, either mounted on the aircraft or located on the ground, have been proposed and are in use. The major disadvantages of these methods is their complexity and less than adequate performance, making their use subject to failure. In addition, their complexity makes them expensive. Hence, in addition to providing a method for aiding in the prevention of mid-air collisions it is also desirable to provide a method that is relatively uncomplicated and low in cost.

In addition to the foregoing disadvantages, the prior art methods have other disadvantages. One outstanding disadvantage is that warning or collision avoidance signals from non-intruding aircraft interfere with signals from intruding aircraft so as to prevent the interpretation of the signals. To avoid this interference some prior art systems use time-frequency methods requiring the carrying of ultra-stable timing devices, such as atomic clocks or precision oscillators to measure range and establish assigned time-slots for transmission. These devices or clocks require frequent re-synchronization by primary synchronizing sources, the end result being that the equipment is expensive and complex. Another warning method uses signals reflected from the ground, however, these signals were unreliable because of terrain irregularities.

A satellite aided vehicle avoidance system (SAVAS) is described in U.S. Pat. No. 3,550,129, issued Dec. 22, 1970, Ser. No. 811,542, filed Mar. 28, 1969. To date it represents a significant improvement over prior art systems. However, its primary disadvantage is the ellipticity of its detection and alarm threshold zones. Thus, if the direction of the intruding vehicle is not known, his range is known only within limits, which, for example, might have a three to one ratio. While the patented SAVAS does not require measurement of range to measure the time-to-collision, knowing the exact range of an intruding vehicle is of prime importance. For example, if the relative closing velocity of a pair of aircraft is below 120 knots, a warning time-to-collision of 30 seconds would permit the intruding aircraft to be less than 1 mile away. The elliptical minimum range warning zone of the patented SAVAS, forces the acceptance of a large percentage of false alarms in order to obtain safety.

Another prior art system, sponsored by the Air Transport Association of America (ATA) is described in their document, ANTC Report No. 117. This system measures range directly and does not have the disadvantage of the elliptical minimum range warning zones of the patented SAVAS. However, to measure range, while avoiding system saturation through time diversity of radio transmissions, the ATA System require precise time synchronization to less than 1 microsecond among all aircraft. In order to maintain this degree of synchronization the ATA System requires the use of a master atomic clock as a time reference. All protected aircraft must carry their own highly stable clocks and must frequently resynchronize the on-board clock to the master clock on the ground. Resynchronization is accomplished by two-day communication with the master clock station or with another recently synchronized aircraft. This is a very complex and costly method.

From the foregoing it is thus seen that a need exists for a system which does not suffer from any of the disadvantages of the prior art, namely inadequacy of performance and/or extreme complexity and high cost which are the primary factors for the limited use of prior art systems.

OBJECTS AND SUMMARY OF THE INVENTION

It is a primary object of the present invention to provide an improved, reliable and less costly system for aiding a vehicle operator, such as an aircraft pilot, to avoid collisions with intruding aircraft.

Another object is to provide an improved satellite aided vehicle avoidance system in which exact range to an intruding vehicle, with mutual collision heading and velocity, is derived without the need for accurate clocks or synchronizing devices.

Yet another object of the invention is to provide an improved satellite aided vehicle avoidance system in which range to an intruding vehicle is derived in a protected vehicle without signal transmission from the protected vehicle.

A further object of this invention is to provide a reliable and less costly method for aiding the operator or pilot of a vehicle, such as an aircraft or ship, in avoiding a collision with another similar vehicle.

Still another object of this invention is to provide a method for aiding vehicle operators to recognize and assess a threat of collision using simple signal transmissions without address to any particular vehicle.

A further object of this invention is to provide a method of assessing threats of collision with more than one vehicle at a time, even in the presence of a large number of vehicles that are not collision threats.

Yet a further object of this invention is to provide a method of one-way ranging, so-called passive ranging because the protected vehicle can obtain range without transmitting, that avoids any need at all for expensive precision time references, such as atomic clocks or any resynchronization of timing devices on-board the vehicles.

These and other objects of the invention are achieved in a system and method in which a repeated series of signals at a carrier frequency $f$ is broadcast from a satellite to all participating vehicles. To simplify the present description the number of vehicles will be limited to two, one a protected vehicle and the other an intruding vehicle, though any number of vehicles may be participating. The vehicles may be aircrafts, ships or the like although hereafter the vehicles will be referred to as aircrafts. Each of the vehicles receives and coherently transponds the satellite signals. In the protected vehicle the transponded signals from the intruding vehicle are received, and the Doppler difference, designated as $D_R$, between the received directe satellite signal frequency and the intruding-vehicle transponded satellite signal frequency is measured. Also, the propagation delay, designated as T, of the received transponded signal over the direct signal is measured. Each of the vehicles transmits an additional signal. The additional signal transmitted by the intruding vehicle is received by the protected vehicle wherein the Doppler shift, designated as $D_T$, in the additional signal received from the intruding vehicle is measured. Range, designated as R, of the intruding vehicle is computed as a function of $D_R$, $D_T$ and T, using $c$, the speed of light as a constant factor.

$$R = \frac{cTD_R}{D_T} \qquad (1)$$

Time-to-collision may be computed as a function of $T$, $f$ and $D_R$.

$$\text{Time-to-collision} = \frac{Tf}{D_R} \qquad (2)$$

Also each vehicle may encode information pertinent to itself onto the satellite signal which it transponds.

It should be appreciated that in the present system and method a measurement of range between mutually intruding vehicles is made without any need for common precision time. The received satellite signals provide all the time reference and synchronization required and the satellite signals need not be precisely timed for the purpose of the described measurement of range. Except for practical requirements of signal power, all the time and frequency measurement described and needed for range determination by the inventive method could be obtained using a single unscheduled 100 microseconds transmitted pulse from the satellite, plus the described additional-signal.

It should further be appreciated that the system and method accomplish passive or one-way ranging, in that any one vehicle need not transmit any signals to accomplish a measurement of range. In the protected vehicle the transponding of the satellite signal and the transmission of the additional signal is done to provide information to other vehicles to be protected. Coherent transponding preserves the necessary Doppler characteristics of the signal so that the Doppler difference between the direct and transponded satellite signal as received by the protected vehicle truly reflects the relative velocities of the two vehicles and the vehicle-satellite geometry. To permit the measurement by the protected vehicle of the propagation delay of the transponded satellite signal over the direct satellite signal, a suitable timing modulation on the satellite signal is employed. Phase modulation is advantageous for this purpose in that on reception the extraction of Doppler information is minimally affected, especially if certain digital codes, known to those versed in the art, are used.

The foregoing is a description of the basic embodiment of the invention. As will become apparent from the following description the system is capable of enabling each vehicle to transmit to the other vehicles encoded pertinent information, such as altitude, identity, maneuvering and maneuver intent, all of which can be used by the protected vehicle to minimize the likelihood of collision.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
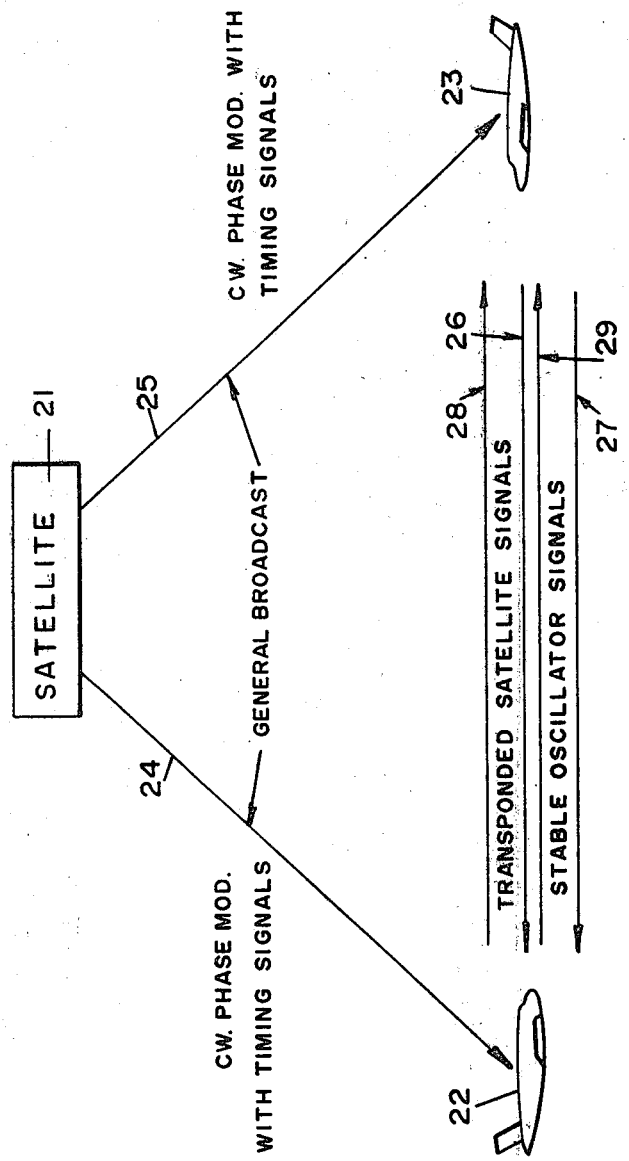
FIG. 1 is a simple diagram useful in explaining the overall principles of the present invention.

Before proceeding to describe the principles underlying the present invention and a specific embodiment, reference is first made to FIG. 1 wherein numeral 21 designates a satellite in orbit around the earth. The satellite broadcasts a repeated signal sequence to a vehicle population. To simplify the description the population is shown consisting of only two vehicles, aircraft 22 and 23.

The signal sequence duration might designate an epoch, initiated by the transmission of distinctive epoch-start timing signals, followed by a train of time-slot-start timing signals in sufficient number and with sufficient separation for the dispersed vehicle p opulation. One skilled in the art will be aware of suitable distinctive modulations for the epoch-start signal, such as a triple pulse group, and of suitable means, such as receiver gating, to eliminate interference by transponded epoch-start signals also being received. The signal sequence is repeated continually by the satellite, producing a steady succession of epochs. Members of the vehicle population are assigned uniquely to time-slots by ordinal number, or if unassigned, acquire an empty slot. The start of an assigned time slot, is recognized by counting time-slot-start signals after the receiving of an epoch-start signal.

Each of aircraft 22 and 23 coherently transponds the received satellite time-slot-start signal in its uniquely assigned time-slot. If desired, each vehicle may follow the transmission of the transponded received satellite signal with a transmission of encoded pertinent information concerning itself, such as altitude, identity, maneuvering and maneuver intent. Each vehicle also broadcasts in its time-slot an additional stable oscillator signal to the other vehicle.

Each vehicle listens during all time-slots for significant signals from other vehicles. Because a transponded time-slot-start signal will be the first signal to be received in a time-slot after the direct path time-slot-start signal, the delay of this transponded signal can be made a basis for gating out signals from other vehicles that are too distant to be of interest.

In FIG. 1 let aircrafts 22 and 23 be thought of as the protected and intruding aircrafts, respectively. Lines 24 and 25 designate the direct paths of the satellite signals to aircraft 22 and 23 respectively, while lines 26 and 27 respectively represent the transponded satellite signal and the additional signal transmitted by intruding aircraft 23 and which are received by the system in the protected aircraft 22. The system in protected aircraft 22, using the received direct satellite signal and the received satellite signal transponded by intruding aircraft 23, measures the Doppler difference frequency (the difference of the carrier frequencies), designated as $D_R$, and the relative propagation delay, designated as T.

The added signal transmitted by intruding aircraft 23 is used by the protected aircraft 22 to measure a true Doppler shift, designated as $D_T$. If the frequency of the added signal differs significantly from that of the satellite signal, the measured $D_T$ is adjusted (multiplied) by the ratio of the satellite signal frequency to the added signal frequency. Once T, $D_R$ and $D_T$ are determined, the indicated range R is derived by the relationship.

$$R = \frac{cTD_T}{D_R}. \qquad (1)$$

The time-to-collision is determined from the expression $$\text{Time-to-collision} = \frac{Tf}{D_R}. \qquad (2)$$

In the above expressions, as previously defined, c represents the speed of light and f represents the frequency of the signals broadcast by the satellite.

It is thus seen that the protected aircraft 22 does not transmit any signals in order to measure the range R of intruding aircraft 23. Thus the present system can be thought of as a one-way or passive ranging system since range is derived in the protected aircraft without signal transmission therefrom. It is further seen that range is determined without any need for expensive precision time references, such as atomic clocks, or any synchronization of timing devices.

It should be appreciated however that since the protected aircraft 22 acts as a potential intruding aircraft for aircraft 23, it too transponds the satellite signal and transmits an additional signal for aircraft 23 or any other aircraft wherein the range to aircraft 22 is computed. The paths of the transponded satellite signal and the added signal from aircraft 22 are designated in FIG. 1 by numerals 28 and 29 respectively.

For a further understanding of the principles of the present invention, consider first a direct ranging system, such as one which uses conventional radar or one-way ranging as described in the above referred to ANTC Report No. 117. In such a system range is determined by measuring the signal propagation delay between two vehicles and multiplying the one-way delay by the velocity of light. The multiplication may be direct or by analog methods.

In the present invention the propagation delay of the transponded satellite signal relative to the direct satellite signal is also multiplied by the velocity of light to obtain the difference in propagation path length of the two signals. However, this difference in path length is a function of the satellite elevation angle and the satellite azimuth angle with respect to the relative velocity vectors of the vehicle pairs concerned. When an intrusion is on a collision heading and velocity, this satellite elevation and azimuth function affects the signal path length difference and the signal Doppler difference in the same proportion. The quotient of this path length difference divided by the Doppler difference frequency cancels the effect of the relative satellite azimuth and elevation and is found to equal the quotient of the vehicle range divided by the simple Doppler frequency shift due only to the relative velocity of the vehicles. The range between the vehicles is accordingly equal to the measured path length difference cT times the ratio of the simple Doppler shift $D_T$ to the Doppler difference $D_R$ between the direct and transponded satellite signals.

As previously pointed out, if the additional-signal transmission by the vehicles, used to obtain the simple Doppler frequency, is not at the frequency of the satellite signal, then the Doppler shift measured must be adjusted to the value that would be obtained if the additional signal were at the satellite signal frequency. This is done by multiplying the measured Doppler shift by the ratio of the satellite signal frequency to the frequency used for the additional-signal. It should be appreciated that the measurement of range R in accordance with the present invention is not affected by the velocities of the vehicles because the Doppler values are changed proportionally.

It should be noted that the transponding of the satellite signal may be at a frequency different from the frequency f of the signal broadcast by the satellite as long as a known offsetting frequency is used. When such a frequency change is used the development of the Doppler difference frequency derived by the protected vehicle must be adjusted in compensation so as to obtain the value of Doppler difference $D_R$ that would have been obtained, if the transponding had been done without altering the frequency. The term "coherent transponding" should be interpreted to include such frequency offsetting.

It should further be noted that the described additional-frequency, transmitted by the transponding vehicle, may be modulated onto the transponded satellite signal, or vice versa, if such modulation is done in a manner to preserve the Doppler characteristics of the signals, for example, using proper phase modulation.

It should be appreciated that the measurement of the Doppler difference $D_R$ between the direct satellite signal frequency and the transponded satellite signal frequency might be replaced by a measurement of the relative propagation delay rate. Therefrom, the Doppler difference frequency $D_R$ may be computed. This computation consists of multiplying the relative delay rate by the signal frequency f. This alternate procedure gives essentially the same result as the use of the Doppler difference frequency directly. Other equivalent computational variations involve substitutions of the forms of the relationship; the product of frequency times wavelength equals the velocity of light.

To understand the determination of the time-to-collision, consider that when the propagation delay of the transponded satellite signal relative to the direct satellite signal is multiplied by the frequency of the satellite signal, the product is the number of satellite signal wavelengths in the signal path length difference. When the two vehicles are on collision headings and velocities, the Doppler difference between the received transponded satellite signal frequency and the direct satellite signal frequency is equal to the path length difference rate of change in wavelengths per second. The quotient of the number of satellite signal wavelengths in the path length difference divided by the rate of change of the path length difference in wavelengths per second is equal to the time until the path length difference becomes zero, that is, the time-to-collision.

EXAMPLE

Let:
Intruder range (co-alt. collision course) = 10 naut. miles
Intruder relative velocity = 1,200 knots
Satellite elevation angle = 60°
Satellite azimuth (with respect to the relative velocity vector of the protected vehicle) = 45°
Adjusted additional-frequency = 1,600 MHz.
Satellite frequency = 1,600 MHz.
Under these conditions measurements by the protected vehicle would show:
Relative propagation delay of the transponded satellite signal = 39.9 $\mu$-seconds
Doppler difference = 2,130 Hz.
Doppler shift of additional signal = 3,297 Hz.
Then:
Range would be determined as $$R = Tc \cdot \frac{D_T}{D_R} = (39.9 \times 10^{-6}) \times (0.1619 \times 10^{6}) \times \frac{3297}{2130} = 10 \text{ miles}$$

Time-to-collision as $$\frac{Tf}{D_R} = \frac{(39.9 \times 10^{-6}) \times (1600 \times 10^{6})}{2130} = 30 \text{ seconds}$$

If certain information is modulated onto the transponded satellite signal or the additional signal by a transponding vehicle, this information when used by the operator of the protected vehicle will increase that operator's capability to determine whether a maneuver should or should not be made. Intruder altitude, current maneuver and intended maneuver are critical items of information to the operator of the protected vehicle. Intruder identity revealed in this way to be protected vehicle allows the operator of the protected vehicle to call the intruder by radio and alleviate a threatening intrusion. These types of information are advantageously digitally encoded onto the satellite signal as it is being transponded, using phase modulation. Such digital encoding techniques are well known by those familiar with the art.

When the signal sequence transmitted by the satellite has the form of a continuous wave (CW) modulated by timing signals, the peak power in the satellite for the transmission is minimized. However a reduction in average power for the satellite transmission is achieved by interrupting or switching off the transmission of the continuous wave after each period of transmission (that includes a timing signal) has provided signal power sufficient to adequately maintain satellite signal acquisition, Doppler measurement and transponded information demodulation by the vehicles.

To allow separation of the signals transponded by the total population of vehicles and avoid signal interference from the simultaneous reception of more than one transponded signal, the transponding of each particular vehicle may be ordered by the satellite signal sequence in a mode similar to that used by the referenced ATA Collision Avoidance System. For this purpose the satellite signal sequence could include a distinctive timing signal to indicate the start of an epoch containing an adequate number of time-slots for the time diversity needs of the vehicle population. Specific vehicles would be assigned to specific time-slots for their transponding. The ordering of the time-slots could be by counting the ordinal number of the timing signals between the epoch-start signals by each vehicle. The reception of a timing signal in the direct satellite signal would mark the start of the time-slot and would be followed by the transponding of the satellite signal for the necessary and proper length of time during that time-slot by the vehicle assigned to that time-slot. The timing signal itself must be included in the transponding. Consideration of the duration of transponding and the use of unassigned time-slots by unassigned vehicles could be in accordance with the factors and policy expressed by the ATA in the above referred to document, ANTC Report No. 117.

Figure 2:
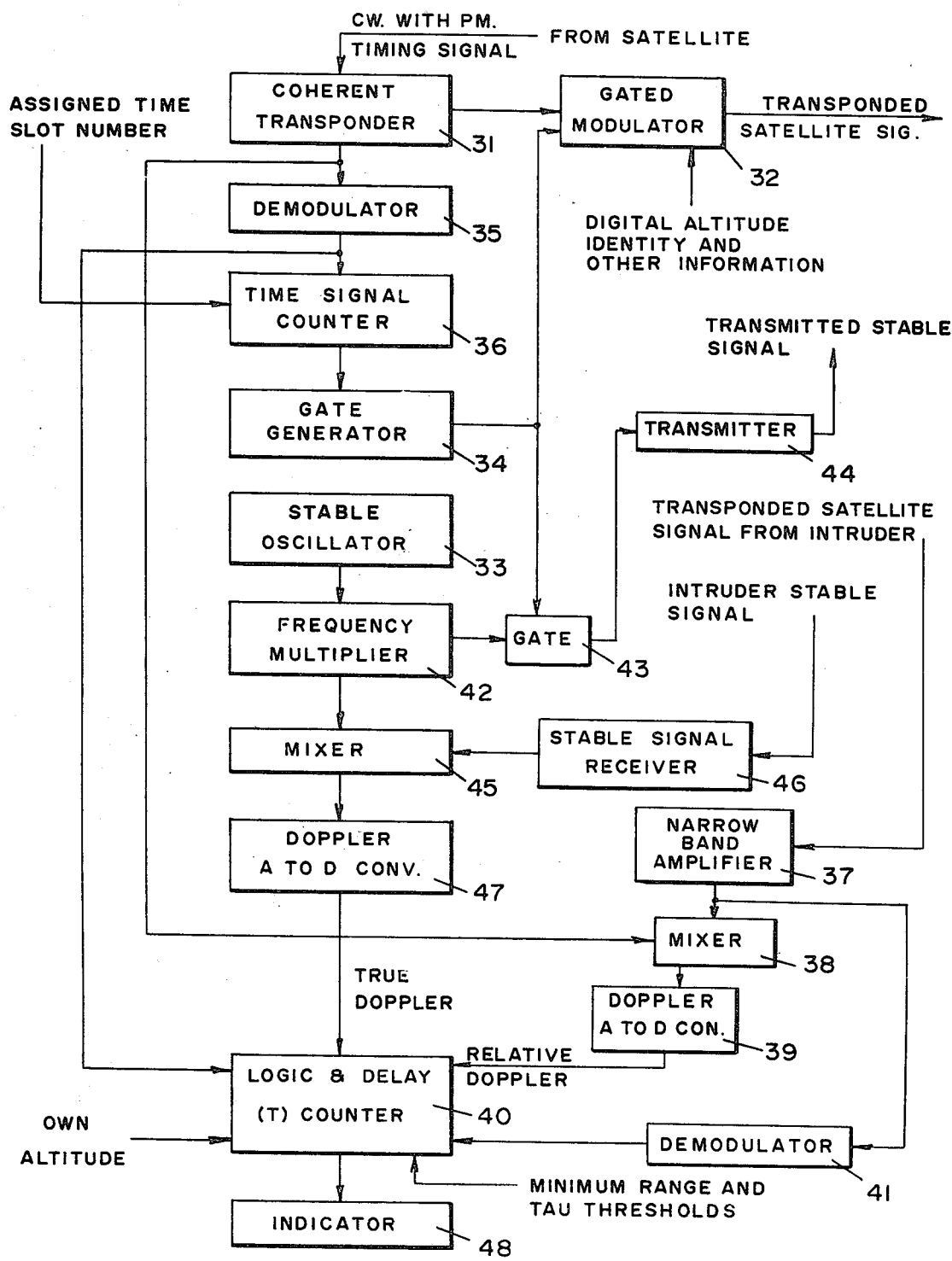
FIG. 2 is a block diagram of circuitry in each of the aircrafts shown in FIG. 1.

Attention is now directed to FIG. 2 which is a simplified diagram of an example of the equipment that could be carried on-board one vehicle to practice the teachings of the invention. The received satellite signal is received by way of a suitable antenna at the coherent transponder 31, which retransmits the satellite signal by way of the gated modulator 32. Those skilled in the art are aware of means to prevent oscillation by the transponder, such as diplexing or use of an auxilliary p-hased locked stable oscillator as a transmission frequency reference while the receiver is gated off. These means are not illustrated in FIG. 2.

The gated modulator 32, controlled by the gate generator 34, passes the amplified satellite signal from the transponder for retransmission when the assigned time-slot occurs. In the present example the modulator 32 is gated on just in time to pass the time-slot-start signal from the satellite in order that this signal may be available at a protected aircraft for measurement of the transponded signal propagation delay. The gate generator 34 also controls the modulation of own-vehicle altitude data and other information onto the transponded satellite signal, following the transponding of the timing signal.

The received direct satellite signal is also demodulated by the demodulator 35 to obtain the epoch-start and time-slot-signals for modulator gating purposes. These timing signals are fed to the time signal counter 36, which recognizes the epoch-start signal by comparison with a reference and then counts the time-slot-start signals that follow. When the assigned slot number less one is reached, a fine timing sequence is started in the gate generator 34 that develops a gate-open waveform to the gated modulator 32 in time to pass the time-slot-start signal that initiates the time-slot assigned to the transponding vehicle.

Transponded satellite signals with their superimposed information from other vehicles when received during other time-slots are fed through the narrow-band amplifier 37 to the mixer 38. Here the received transponded signals are mixed with the direct satellite signal from the coherent transponder 31 to develop the Doppler difference frequency signals. These Doppler difference signals are conducted to the Doppler A to D converters 39, which converts the Doppler difference frequency $D_R$ to digital form and feeds the digital value to the logic and delay counter 40.

The demodulator 41 receives the transponded signals of other vehicles by way of the narrow-band amplifier 37 and separates the transponded time-slot-start signals. The transponded time-slot-start signals are then fed to the logic and delay counter 40. The time-slot-start signals that were obtained from the direct satellite signal by demodulator 35 are also fed to the logic and delay counter 40. The time difference of arrival of the two time-slot-start signals is measured by the logic and delay counter 40 to obtain the value of their relative delay T, taking transponder delay into account.

The additional-frequency signal is initiated by the stable oscillator 33 and conducted to the frequency multiplier 42 where the frequency is multiplied to the value to be used. This signal then is passed through the gate 43, which is controlled by the same gate waveform that gates-on the gated modulator 32 during the assigned time-slot of the vehicle.

The additional-signal output of gate 43 is fed to transmitter 44 and transmitted to the other vehicles during the assigned time-slot. The additional-signal developed by the frequency multiplier 42 is also passed to the mixer 45 where it is mixed with the additional-signals received from other vehicles by way of the stable signal receiver 46. From these inputs, the mixer 45 obtains the Doppler shift frequency $D_T$ of the received additional-signal and passes it to the Doppler A to D converter 47, which converts the value of Doppler shift frequency to digital form and passes it to the logic and delay counter 40.

The logic and delay counter 40 also receives its vehicle's altitude and other information, such as minimum range and time-to-collision (Tau) thresholds useful for logical assessment of collision threats. The logic and delay counter 40 by the means described receives all the data to compute, as heretofore described, the range R to those other vehicles that have collision headings and velocities relative to the protected vehicle. The value of time-to-collision can be computed also in each case as heretofore described. The results of the computations may be passed to the indicator 48 for display or may be used in further logical processing to indicate the appropriate collision avoidance maneuver.

It should be clear to those familiar with the art that the logic and delay counter 40 may be implemented to perform the functions assigned thereto as a special-purpose computer or as a small general purpose computer, properly programmed. The rest of the circuits shown in FIG. 2 are shown in the art and therefore are shown in block form only. It should be appreciated that the arrangement shown in FIG. 2 is but one example of a system to practice the teachings disclosed herein. Clearly other circuit combinations may be employed to practice the novel teachings which may again be summarized as follows: broadcasting a repeated signal sequence from a satellite to participating vehicles; transponding the sequence in turn by each of the vehicles with an additional signal; receiving in the protected vehicle the direct satellite signal, the transponded satellite signal and the additional signal; measuring in the protected vehicle the propagation delay time T between the received direct and transponded satellite signals, also the Doppler frequency difference $D_R$ between the received direct and transponded satellite signals, and the Doppler shift $D_T$ of the received additional signal; and making a measurement of the range R between the protected vehicle and the intruding vehicle which transponded the satellite signal and coded the additional signal, by multiplying the propagation delay time T by the velocity of light c, and further by the ratio of the obtained Doppler shift of the additional signal to the obtained Doppler difference between the satellite signals. The teachings may further include the step of computing time-to-collision by multiplying T by the frequency $f$ of the satellite signals and dividing by the obtained Doppler difference $D_R$ and also the step wherein pertinent information is transmitted by each vehicle with the transponded satellite signals or with the additional signal.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A method of measuring range from a protected vehicle to an intruding vehicle with the aid of a signal transmitted by a satellite to a population of vehicles comprising the steps of:

receiving in each of the vehicles the satellite transmitted signal;

transponding the satellite transmitted signal by said intruding vehicle;

receiving the transponded signal in said protected vehicle;

utilizing in said protected vehicle the satellite transmitted signal, directly received by said protected vehicle, and the satellite transmitted signal transponded by said intruding vehicle, to derive a propagation delay of the transponded satellite signal relative to the directly received satellite signal and a Doppler difference between the directly received satellite signal frequency and the transponded satellite signal frequency;

transmitting by said intruding vehicle an additional signal;

receiving said additional signal in said protected vehicle;

measuring in said protected vehicle the Dopper shift of said additional signal; and deriving in said protected vehicle the range from said protected vehicle to said intruding vehicle as the product of the said propagation delay, the speed of light, and the ratio of the said Doppler shift to the said Doppler difference.

2. The method as recited in claim 1 wherein said protected vehicle transponds the satellite signals received thereby and transmits an additional signal for use by another of said population of vehicles in computing the range of said protected vehicle therefrom.

3. The method as recited in claim 2 wherein the vehicles transponding said satellite signals transmit therewith coded information pertaining to said transponding vehicles.

4. The method as recited in claim 3 wherein said coded information is one of the group of information consisting of vehicle altitude, vehicle identity and vehicle maneuver.

5. The method as recited in claim 1 further including the step of computing the time-to-collision between said protected vehicle and said intruding vehicle as a function of said propagation delay, the frequency of the satellite transmitted signals and said Doppler difference.

6. A system for measuring range between a protected vehicle and an intruding vehicle, both vehicles being part of a vehicle population to which signals are transmitted from an earth-orbiting satellite, the system comprising:
first and second receiving means in said protected and intruding vehicles respectively for receiving therein the signals transmitted by said satellite;
transponding means in said intruding vehicle for transponding the satellite signals received by said second receiving means;
third receiving means in said protected vehicle for receiving the transponded satellite signals transponded in said intruding vehicle;
transmitting means in said intruding vehicle for transmitting an added signal;
fourth receiving means in said protected vehicle for receiving said added signal; and
computing means including means for deriving a relative propagation delay, designated as T, which is the difference in the times of reception of said satellite signals by said first receiving means and of said transponded satellite signals by said third receiving means, means for deriving a Doppler difference, designated as $D_R$, which is the difference in the frequencies of the signals received by said first and third receiving means, means for deriving a Doppler shift, designated as $D_T$, of the frequency of the received added signal, and means for computing the range, designated as R, between said protected and intruding vehicle, where $$R = \frac{cTD_T}{D_R}$$

wherein
R is the said range
c is the speed of light
T is the said relative propagation delay
$D_T$ is the said Doppler shift
$D_R$ is the said Doppler difference.

7. The arrangement as recited in claim 6 further including means in said protected vehicle for transponding the satellite signal received therein and means for transmitting an added signal.

8. The arrangement as recited in claim 7 further including means in each vehicle for transmitting coded information pertaining to said vehicle with the transponded vehicle signals or with the added signal.

9. The arrangement as recited in claim 8 wherein means in each vehicle for transmitting coded information comprise means for transmitting information related to either vehicle altitude, vehicle identity or vehicle maneuver.

10. The arrangement as recited in claim 6 further including means in said protected vehicle for computing a time-to-collision between the protected and intruding vehicles as a function of T, f and $D_R$, where f is the frequency of the satellite signal, time-to-collision being equal to $$\frac{Tf}{D_R}.$$

11. A method of assessing a threat of collision by determining the range between two vehicles on mutual collision courses comprising the steps of:
transmitting signals from a satellite to said vehicles;
receiving said signals by each of said vehicles;
coherently transponding said signals by each of said vehicles;
receiving the transponded signals from one vehicle by the second vehicle;
measuring the Doppler difference between the direct satellite signal frequency and the transponded satellite signal frequency from the said one vehicle by the said second vehicle;
measuring the propagation delay of the said received transponded signal relative to the said received direct signal at the said second vehicle;
transmitting an additional signal at a known frequency by each of said vehicles;
receiving the said additional signal by the said second vehicle;
measuring the Doppler shift in the received additional signal by the said second vehicle;
adjusting the said Doppler shift in the received additional signal frequency by multiplying the said shift by the ratio of the said satellite signal frequency to the said additional signal frequency when the said frequencies differ sufficiently to cause unacceptable error;
and finally multiplying the said measured propagation delay by the velocity of light and further multiplying by the ratio of the said adjusted Doppler shift in the received additional signal to the said Doppler difference between the said received direct satellite signal and the said received transponded satellite signal to obtain a measurement of range between the said two vehicles.

12. A method of assessing a threat of collision as claimed in claim 11 including the additional step of encoding pertinent information onto the transponded satellite signal by a transponding vehicle.

13. A method of assessing a threat of collision as claimed in claim 11 including the additional step of encoding vehicle altitude information onto the transponded satellite signal by a transponding vehicle.

14. A method of assessing a threat of collision as claimed in claim 11 including the additional step of encoding vehicle identity onto the transponded satellite signal by a transponding vehicle.

15. A method of assessing a threat of collision as claimed in claim 11 including the additional step of encoding vehicle maneuver information onto the transponded satellite signal by a transponding vehicle.

16. A method of assessing a threat of collision as claimed in claim 11 including the additional step of obtaining a time-to-collision by multiplying the said propagation delay by the frequency of the said satellite signal and dividing by the said Doppler difference between the direct satellite signal frequency and the received transponded satellite signal frequency at the said second vehicle.

17. A method of assessing a thread of collision as claimed in claim 11 wherein the step of transmitting signals from a satellite comprises transmitting continuous wave signals with timing signals modulated thereon.

18. A method of assessing a threat of collision as claimed in claim 11 wherein the step of transmitting signals from a satellite comprises the step of transmitting interrupted continuous wave signals with timing signals modulated thereon.

19. A method of assessing a threat of collision as claimed in claim 17 wherein the step of transmitting signals from a satellite comprises the step of transmitting continuous wave signals with the timing signals being phased modulated thereon.

20. A method of assessing a threat of collision as claimed in claim 17 wherein the step of transmitting signals from a satellite comprises the step of transmitting interrupted continuous wave signals with timing signals which include an epoch-start signal followed by the time-slot-start signals modulated thereon.

* * * * *